(12) United States Patent
Sato

(10) Patent No.: US 12,423,051 B2
(45) Date of Patent: Sep. 23, 2025

(54) MANAGEMENT SYSTEM, NETWORK DEVICE, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Junji Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 18/151,687

(22) Filed: Jan. 9, 2023

(65) Prior Publication Data

US 2023/0221919 A1 Jul. 13, 2023

(30) Foreign Application Priority Data

Jan. 13, 2022 (JP) .................... 2022-003813

(51) Int. Cl.
*G06F 3/16* (2006.01)
*H04B 17/318* (2015.01)
*H04W 28/10* (2009.01)

(52) U.S. Cl.
CPC ........... *G06F 3/165* (2013.01); *H04B 17/318* (2015.01); *H04W 28/10* (2013.01)

(58) Field of Classification Search
CPC ............ G06F 3/165; H04N 2201/0094; H04N 1/00344

USPC ......................................... 709/223
See application file for complete search history.

(56) References Cited

U.S. PATENT DOCUMENTS

| 8,005,037 | B2 * | 8/2011 | Ishii | H04W 28/10 |
| | | | | 370/235 |
| 9,955,027 | B2 * | 4/2018 | Nemoto | H04L 12/1435 |
| 10,165,105 | B1 * | 12/2018 | Do | H04L 51/214 |
| 2014/0075567 | A1 * | 3/2014 | Raleigh | H04L 12/14 |
| | | | | 726/26 |
| 2017/0064730 | A1 * | 3/2017 | Kumar | H04B 17/318 |
| 2022/0286945 | A1 * | 9/2022 | Yamamoto | H04L 5/0048 |

FOREIGN PATENT DOCUMENTS

| CN | 101516046 A | * | 8/2009 |
| JP | 2004153455 A | | 5/2004 |
| JP | 2019076137 A | * | 5/2019 |

\* cited by examiner

*Primary Examiner* — David R Lazaro
*Assistant Examiner* — Mariegeorges A Henry
(74) *Attorney, Agent, or Firm* — Canon U.S.A., Inc. IP Division

(57) ABSTRACT

A network device acquires a service setting from a management server based on a service contract, counts and manages a communication volume for each communication type based on the service setting, and controls communication for each function based on the service setting and the communication volume.

9 Claims, 14 Drawing Sheets

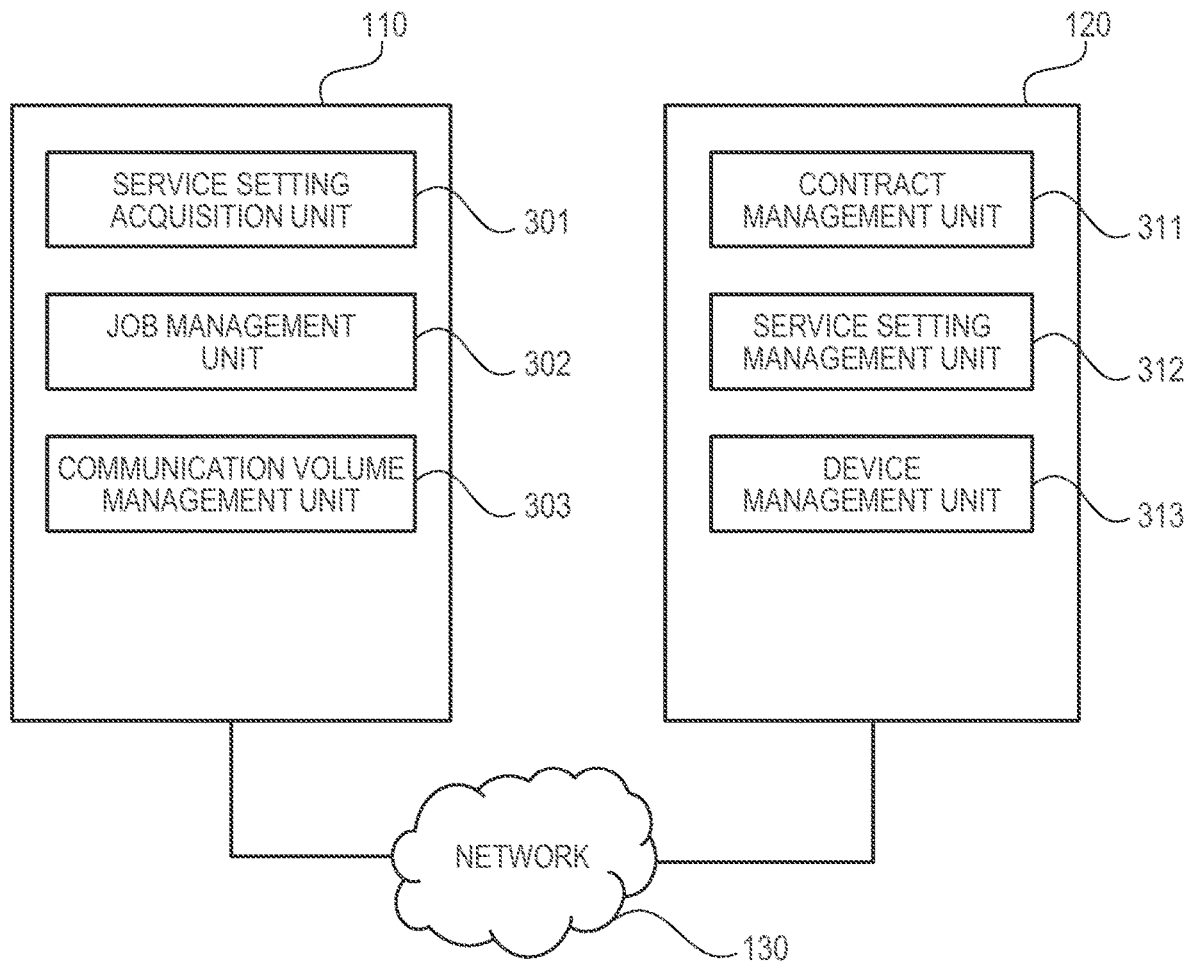

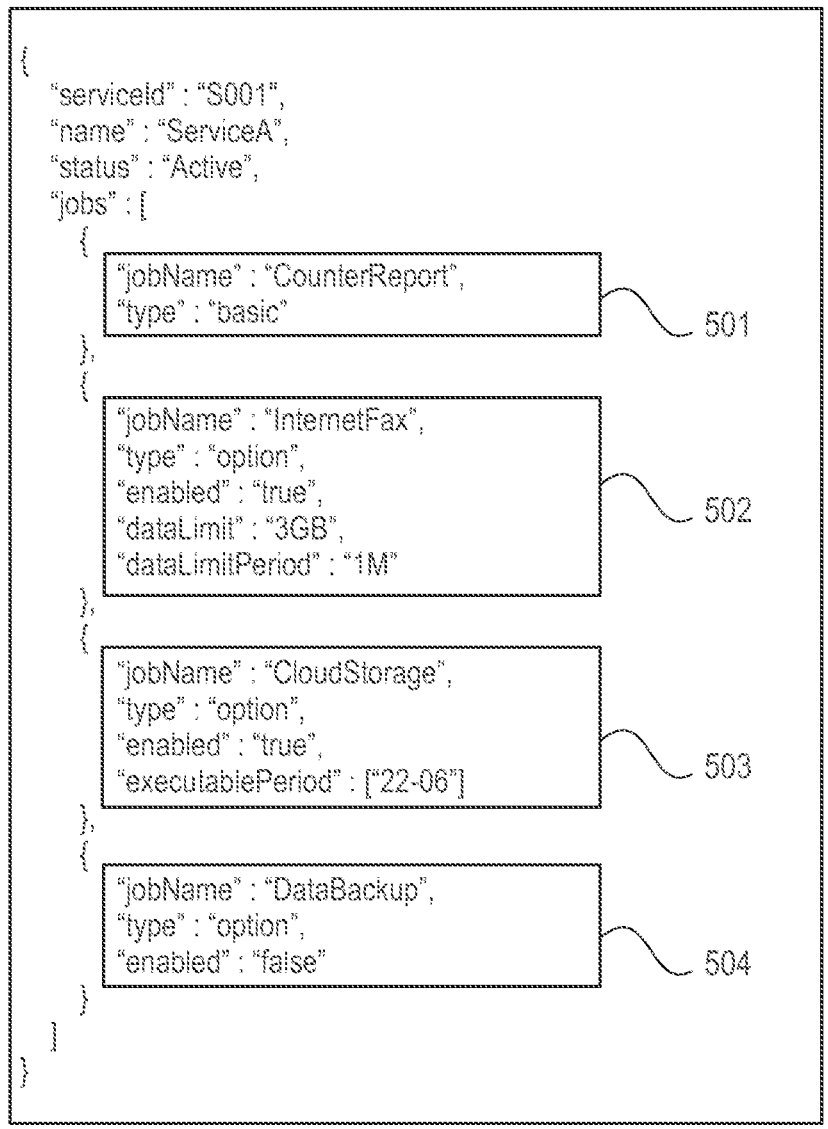

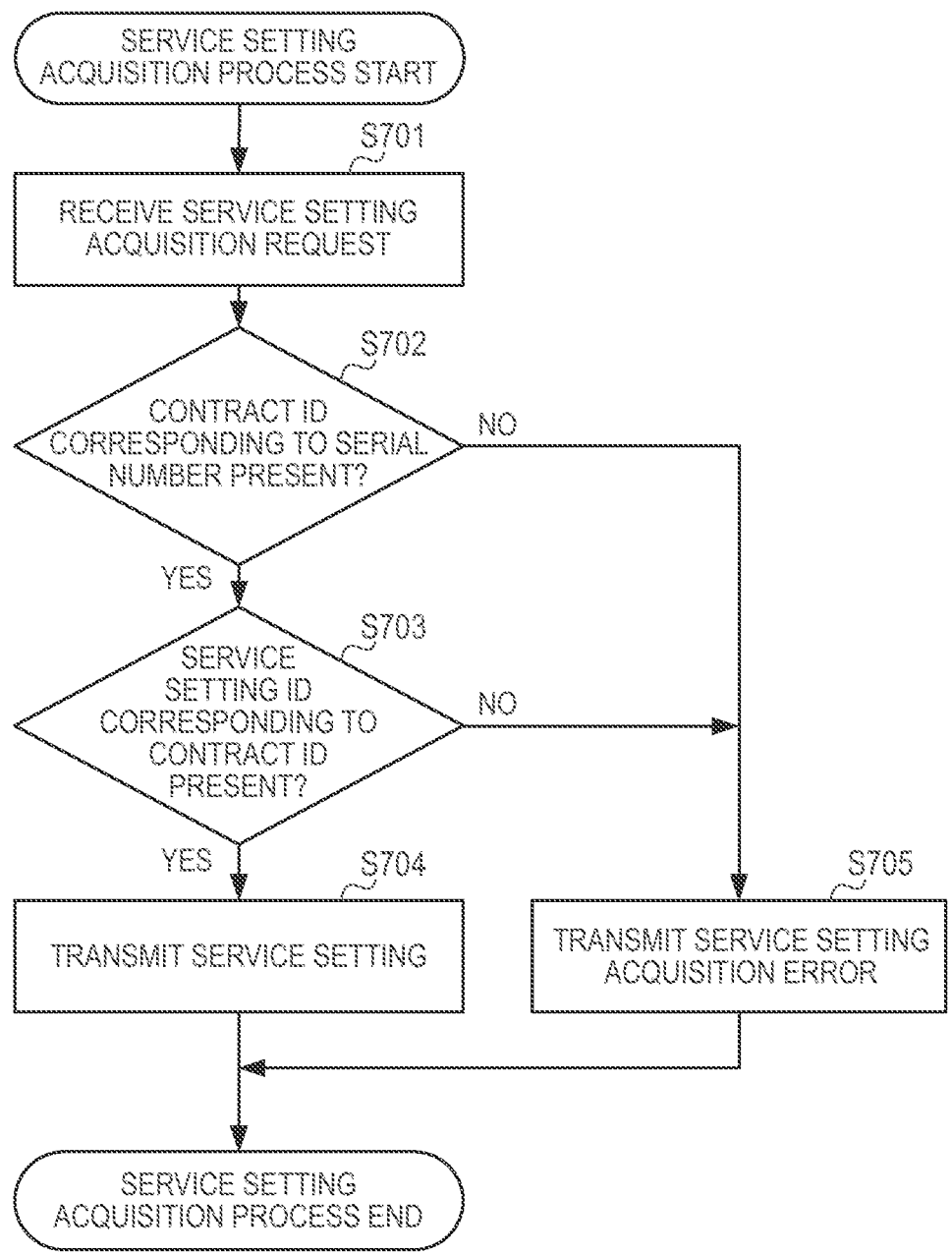

FIG. 14

| Communication ID 1401 | Communication target 1402 | Job type 1403 | Communication type 1404 | Communication start time 1405 | Communication end time 1406 | Communication volume 1407 |
|---|---|---|---|---|---|---|
| 10000001 | devicevender.com | CounterReport | basic | 2020/1/4 0:34:01.332 | 2020/1/4 0:34:02.844 | 14KB |
| 10000002 | devicevender.com | CounterReport | basic | 2020/1/4 1:04:00.101 | 2020/1/4 1:04:01.490 | 14KB |
| 10000003 | cloud-xxx-storage.com | CloudStorage | option | 2020/1/4 2:00:01.239 | 2020/1/4 2:03:19.898 | 4.3MB |

FIG. 16A

```
{
    "serviceId" : "S001",
    "name" : "ServiceA",
    "status" : "Active",
    "jobs" : [
        {
            "jobName" : "CounterReport",
            "type" : "basic"                              — 501
        },
        {
            "jobName" : "InternetFax",
            "type" : "option",
            "enabled" : "true",
            "dataLimit" : "3GB",                          — 1601
            "dataLimitPeriod" : "1M",
            "limitExceeded" : "true",
            "limitResetAt" : "2020/06/01"
        },
        {
            "jobName" : "CloudStorage",
            "type" : "option",
            "enabled" : "true",                           — 503
            "executablePeriod" : ["22-06"]
        },
        {
            "jobName" : "DataBackup",
            "type" : "option",                            — 504
            "enabled" : "false"
        }
    ]
}
```

MANAGEMENT SYSTEM, NETWORK DEVICE, CONTROL METHOD, AND NON-TRANSITORY COMPUTER-READABLE STORAGE MEDIUM

BACKGROUND

Field of the Disclosure

The present disclosure relates to a management system that manages a network device, a network device, a control method, and a non-transitory computer-readable storage medium.

Description of the Related Art

With the spread of cloud services and Internet of Things (IoT), systems in which devices such as an image processing device are managed by using a device management server are known. Implementation of IoT generally takes a form such that a device directly communicates with a cloud service or the like via a communication scheme using a Subscriber Identity Module (SIM) card or the like.

Communication performed by an IoT device includes communication of basic information required for managing a device, such as a counter value, an operated period, a remaining level of consumables, or the like (hereafter, referred to as "basic communication") and communication of additional information generated in accordance with a result that a user has used, such as transmission of image data (hereafter, referred to as "user communication"). Communication using a SIM card is charged in accordance with a communication volume or a communication time. It is thus desirable to distinguish the basic communication and the user communication from each other and charge for the user communication in accordance with a usage amount or the like, for example.

Japanese Patent Application Laid-Open No. 2004-153455 discloses an art of aggregating communication volumes in accordance with a communication target with which a device communicates. In Japanese Patent Application Laid-Open No. 2004-153455, communication volumes are aggregated on a communication target basis, and this enables charge for respective systems such as for private use and business use.

In the art of Japanese Patent Application Laid-Open No. 2004-153455 described above, however, communication volumes are aggregated in accordance with a communication target. Thus, for communication with the same communication target, it is not possible to switch communication control. It would be desirable to distinguish the basic communication and the user communication from each other and control the user communication in accordance with the content, the time of day, or the like of the communication in accordance with a contract with the user regardless of the communication target. However, it is not possible to perform such control in the conventional art.

SUMMARY

Embodiments of the present disclosure have been made in order to solve the above issue. Embodiments of the present disclosure provide a mechanism that can flexibly control communication for each function of a network device in accordance with the content, the time of day, or the like of the communication in accordance with a service contract form made by a user.

Embodiments of the present disclosure include a management system in which a network device and a management server that manages the network device are configured to communicate with each other, the management server has: a first management unit that manages, as a service setting, a communication type and a communication control instruction for each function in association with a service contract, and the network device has: an acquisition unit that acquires the service setting from the management server based on a service contract; a second management unit that manages a communication volume for each communication type based on the service setting; and a control unit that controls communication for each function based on the service setting and the communication volume.

According to embodiments of the present disclosure, it is possible to flexibly control communication for each function of a network device in accordance with the content, the time of day, or the like of the communication in accordance with a service contract form made by a user. As a result, it is possible to flexibly provide a function of the network device according to a service use contract made by the user.

Further features of the present disclosure will become apparent from the following description of exemplary embodiments with reference to the attached drawings.

BRIEF DESCRIPTION OF THE DRAWINGS

FIG. 3 is a software configuration diagram according to a first embodiment.

FIG. 4 is a diagram illustrating contract information as an example according to the present embodiment.

FIG. 5 is a diagram illustrating a service setting as an example according to the present embodiment.

FIG. 6 is a diagram illustrating device information as an example according to the present embodiment.

FIG. 7 is a flowchart illustrating a service setting acquisition process as an example according to the present embodiment.

FIG. 14 is a diagram illustrating communication volume information as an example according to the present embodiment.

FIG. 16A is a diagram illustrating a service setting as an example according to the second embodiment.

DESCRIPTION OF THE EMBODIMENTS

The embodiments of the present disclosure will now be described with reference to the drawings. The following embodiments do not limit the present disclosure, and not all of the combinations of features described in the embodiments are essential for achieving the objective of the disclosure.

First Embodiment

Figure 1:
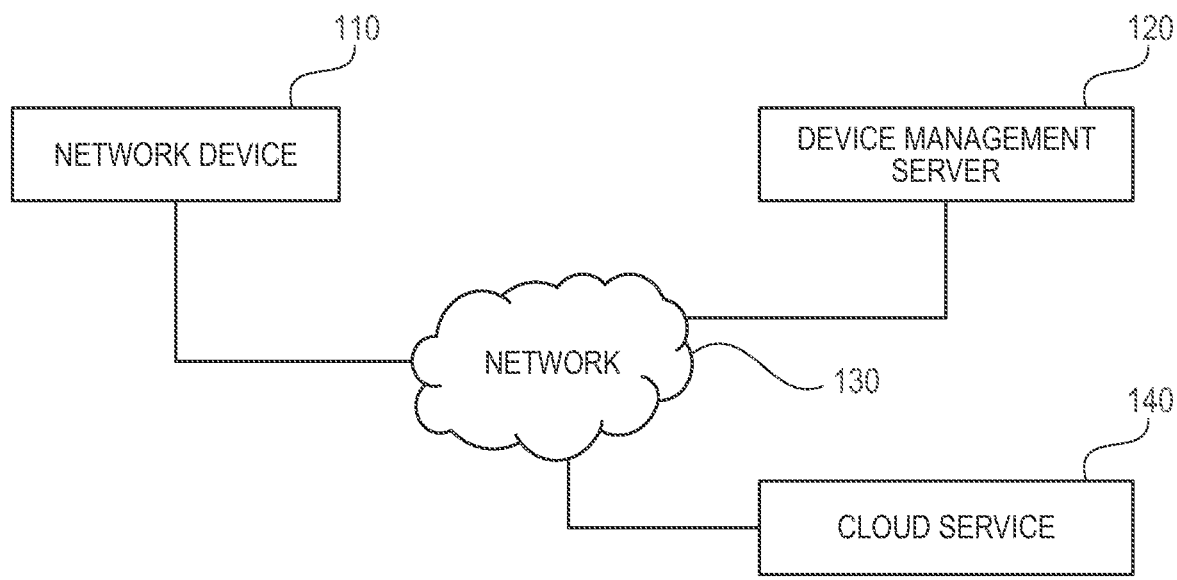
FIG. 1 is a diagram illustrating an example of a configuration of an information processing system according to the present embodiment.

FIG. 1 is a diagram illustrating an example of a configuration of an information processing system according to one embodiment of the present disclosure.

As illustrated in FIG. 1, the information processing system of the present embodiment is a device management system including a network device 110 (hereafter, referred to as a "device 110"), a device management server 120, a network 130, and a cloud service 140. Note that, in addition to the above, an information processing terminal such as a personal computer (PC) (not illustrated) can be connected to the network 130.

The device 110 is connected to the device management server 120 via the network 130 such as the Internet, for example. The device 110 is an information processing device installed and used in a customer organization and may be, for example, an image processing device such as a printer, a copier, a scanner, or the like but is not limited thereto. The device 110 may be various Internet of Things (IoT) devices other than the above. The customer organization refers to an organization such as a company that actually uses the device 110 thereof, and information on the device is managed on a customer organization basis in the device management server 120.

In the device 110, a server connection application (not illustrated) has been installed. The device 110 uses the server connection application to transmit setting information, operational information, or the like to the device management server 120.

The cloud service 140 is a service exposed to the Internet and may be, for example, a storage service for storing data, an Internet FAX service, or the like. By optionally subscribing to the cloud service 140 and providing a setting suitable for using the cloud service 140 to the device 110, the user of the device 110 can use the cloud service 140 via the network device 110.

The device management server 120 manages device information, contract information, service settings, or the like on the device 110.

Note that, although only a single device 110 is depicted in the example of FIG. 1, a plurality of devices 110 may exist for a single customer organization. Further, devices 110 of a plurality of customer organizations may be connected to a single device management server 120.

Figure 2:
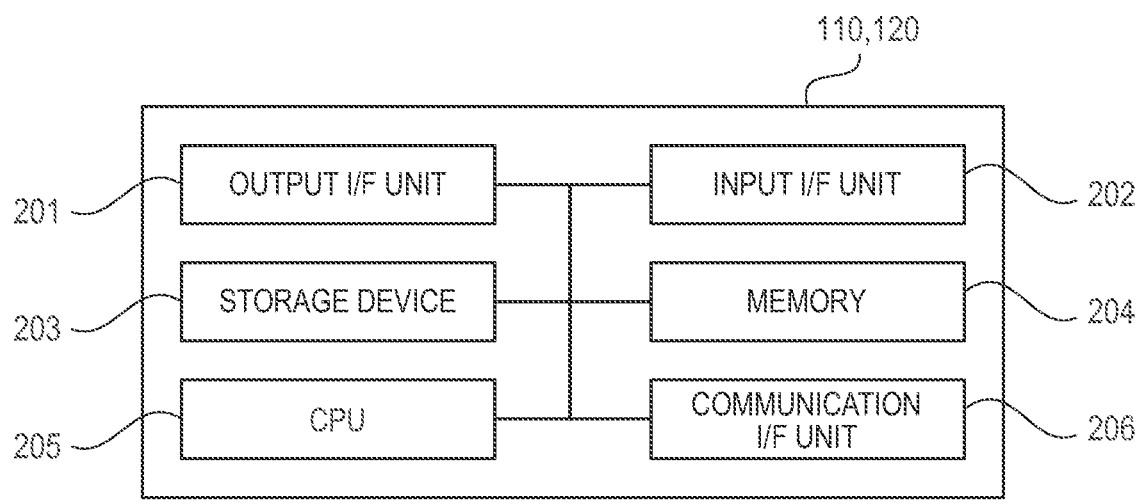
FIG. 2 is a hardware configuration diagram of a computer according to the present embodiment.

FIG. 2 is a diagram illustrating an example of a hardware configuration of a computer that can implement the device management server 120 according to the present embodiment.

An output I/F unit 201 is an interface for connecting an output device such as a display thereto. An input I/F unit 202 is an interface for connecting an input device such as a keyboard.

A storage device 203 stores operating system (OS), an authentication program or a management program in the device management server 120, registration information on the device 110, setting information or operational information received from the device 110, or the like. Herein, the authentication program is a program that performs an authentication and connection process. Further, the management program is a program for managing the registered device 110. Note that the storage device 203 is formed of a hard disk drive (HDD), a solid state drive (SSD), or the like, for example.

A CPU 205 loads the authentication program or the management program from the storage device 203 into a memory 204 and executes the authentication program or the management program. The memory 204 functions as a work area of the CPU 205.

A communication I/F unit 206 is a network interface for performing communication control of the device 110 via the network 130.

Note that the diagram illustrating the hardware configuration of FIG. 2 corresponds to a hardware block diagram of a general information processing device and is also applied to the device 110 of the present embodiment. Since the hardware configuration of the device 110 is the same as above, the description thereof will be omitted. Note that, when the device 110 is an image processing device, a printer unit, a scanner unit, or the like are provided.

Further, in a case of the device management server 120, this may be implemented by a single computer having a configuration as with FIG. 2 or may be implemented by a plurality of computers. For example, the device management server 120 may be configured by being implemented using a cloud computing technology.

FIG. 3 is a diagram illustrating an example of the software configuration of a main configuration part (configuration portion related to the present embodiment) of the device 110 and the device management server 120.

The device 110 includes a service setting acquisition unit 301, a job management unit 302, and a communication volume management unit 303, as the software configuration. These units are implemented when the CPU 205 of the device 110 loads a program stored in the storage device 203 into the memory 204 and executes the program, for example.

The service setting acquisition unit 301 acquires a service setting available with the device from the device management server 120. The service setting will be illustrated with FIG. 5 described later.

The job management unit 302 determines as to whether execution of a job is enabled or disabled or manages the job in the device 110 based on a service setting acquired by the service setting acquisition unit 301. The job as used herein refers to a process executed in the device 110 by accepting a user operation via the input I/F unit 202 of the device 110 or following various programs or execution schedules thereof stored in the storage device 203 or the memory 204. For example, a printing process, a scan process, a service setting acquisition process from the device management server 120, a counter information transmission process to the device management server 120, or the like correspond to jobs.

The communication volume management unit 303 records communication generated due to execution of various jobs based on a service setting acquired by the service setting acquisition unit 301.

The device management server 120 includes a contract management unit 311, a service setting management unit 312, and a device management unit 313, as the software configuration. These units are implemented when the CPU 205 of the device management server 120 loads a program stored in the storage device 203 into the memory 204 and executes the program, for example.

The contract management unit 311 manages contract information according to which the user uses the device 110. The contract information will be illustrated with FIG. 4 described later.

The service setting management unit 312 manages settings for a service content available when the user uses the device 110 (service settings).

The device management unit 313 manages information (device information) on the device 110 registered in the device management server 120. The device information will be illustrated with FIG. 6 described later.

FIG. 4 is a diagram illustrating an example of contract information managed by the contract management unit 311.

The contract ID is an identifier for uniquely identifying a contract.

The customer ID is an identifier for uniquely identifying a customer who has made a contract. It is possible for a single customer to make a plurality of contracts.

The contract start date indicates a date from which the contract is started.

The service setting ID is an identifier for uniquely identifying a service setting provided in the contract.

The contract information as with FIG. 4 can be registered and managed by the provider of the service by using a web browser or the like from an information processing terminal such as a PC (not illustrated) to access the management server 120 when making a service use contract with the user of the device 110. Note that the provider of the service is the same as the provider of the device 110 in general but is not limited thereto.

FIG. 5 is a diagram illustrating an example of a service setting managed by the service setting management unit 312. Specifically, this corresponds to an example in which the service setting ID in FIG. 4 is a service setting of "S001".

In a service setting, it is defined what function is to be provided in the service, that is, what function (job) can be executed by the device 110.

In the example of FIG. 5, as the function involving communication, CouonterReport (501), InternetFax (502), CloudStorage (503), and DataBackup (504) are defined.

The example of block 501 indicates that communication (communication type) of the counter information on the device 110 is "basic communication" (in FIG. 5, "type": "basic"). Herein, the "basic communication" means communication corresponding to a basic function regularly performed in the use of the device 110. For example, transmission of information on a counter value, an operated period, a remaining level of consumables, or the like corresponds to the "basic communication".

The example of block 502 indicates that a FAX function using the Internet is "option communication" (in FIG. 5, "type": "option"). Further, it is indicated that a data capacity of up to 3 GB per month can be used (in FIG. 5, communication control instructions such as "enable":"true", "dataLimit":"3 GB", and "dataLimitPeriod":"1M"). Herein, the "option communication" means communication corresponding to the function that the user intentionally uses. For example, transmission of scanned image data or the like corresponds to "option communication".

The example of block 503 indicates that the storage service function on the cloud is the "option communication", which can be used at night (10 pm to 6 am) (in FIG. 5, communication control instructions such as "enable": "true" and "executablePeriod":["22-06"]).

The example of block 504 indicates that a function of backup of data such as setting values of the device or an address list on the cloud is the "option communication" and is unavailable (in FIG. 5, a communication control instruction such as "enable":"false").

The service setting as with FIG. 5 can be registered and managed by the provider of the service by using a web browser or the like from an information processing terminal such as a PC (not illustrated) to access the management server 120.

As described above, in the service setting management unit 312, communication types or communication control instructions for respective functions are managed in association with a service contract as a service setting.

FIG. 6 is a diagram illustrating an example of device information managed by the device management unit 313.

The SIM ID is an identifier for uniquely identifying Subscriber Identity Module (SIM) mounted in a device.

The model represents model information on the device.

The contract ID is an identifier of contract information managed by the contract management unit 311 and corresponds to the contract ID illustrated in FIG. 4. Device information and contract information are linked by the contract ID.

The device information as with FIG. 6 can be registered and managed by the provider of the service by using a web browser or the like from an information processing terminal such as a PC (not illustrated) to access the management server 120 when making a contract of the service or selling the device 110.

FIG. 7 is a flowchart illustrating an example of a process performed by the device management server 120 when the service setting acquisition unit 301 acquires a service setting. The process of this flowchart is implemented when the CPU 205 performs the process based on a program stored in the storage device 203 or the memory 204.

In S701, in response to receiving a service setting acquisition request from the service setting acquisition unit 301 of the device 110, the device management unit 313 proceeds with the process to S702. Note that, when transmitting a service setting acquisition request, the device 110 adds its own serial number before transmission.

In S702, the device management unit 313 checks whether or not a contract ID associated with the serial number of the device 110 that has transmitted the above service acquisition request is present in the device information as illustrated in FIG. 6. If the contract ID associated with the above serial number is present (S702, Yes), the device management unit 313 proceeds with the process to S703. In contrast, if no contract ID associated with the above serial number is present (S702, No), the device management unit 313 proceeds with the process to S705.

In S703, the device management unit 313 checks via the contract management unit 311 whether or not a service setting ID associated with the contract ID identified in S702 described above (the contract ID associated with the serial number described above) is present in the contract information as illustrated in FIG. 4. If the service setting ID associated with the contract ID described above is present (S703, Yes), the device management unit 313 proceeds with the process to S704. In contrast, if no service setting ID associated with the contract ID described above is present (S703, No), the device management unit 313 proceeds with the process to S705.

In S704, the device management unit 313 acquires, from the service setting management unit 312, a service setting corresponding to the service setting ID identified in S703 described above (the service setting ID associated with the contract ID described above) and transmits the service setting to the device 110.

Further, in S705, the device management unit 313 transmits, to the device 110, an acquisition error of the service setting corresponding to the device that has transmitted the service setting acquisition request.

After the process of S704 or S705 described above, the device management unit 313 ends the process of this flowchart.

Note that the service setting acquisition process illustrated in this flowchart is performed by the device 110 at a predetermined timing. For example, the process may be performed periodically every 24 hours, may be performed when the user intends to operate the device, may be performed at a timing in accordance with the service setting acquisition operation performed by the user, or may be performed at another timing.

Note that the service setting transmitted in S704 described above is received by the device 110. On the device 110, an operation window is displayed based on this service setting.

Figure 8A:
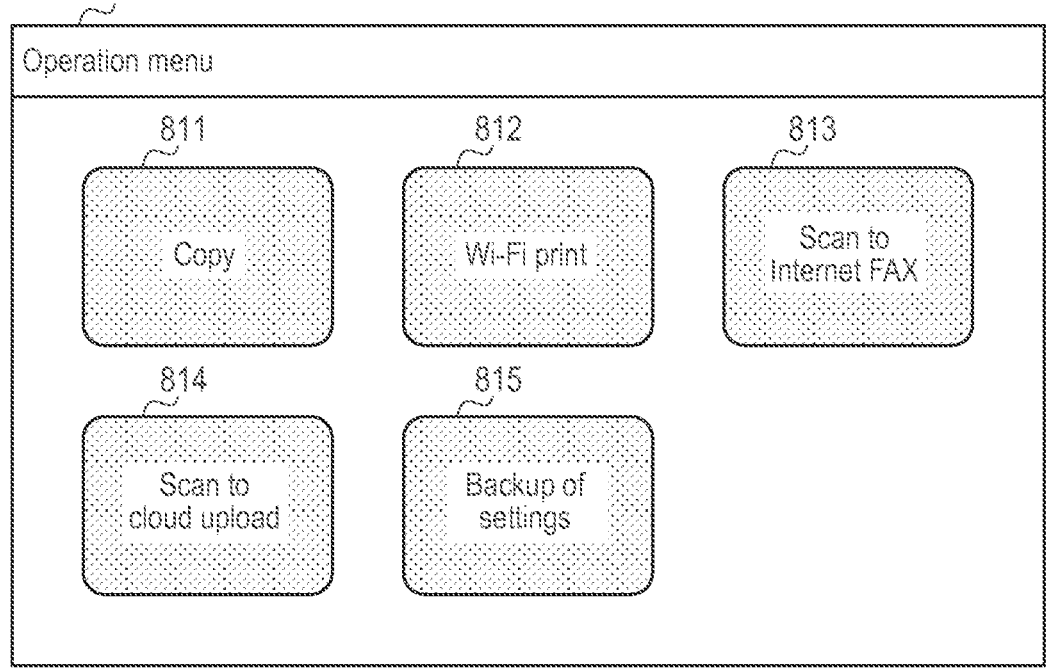
FIG. 8A is a diagram illustrating an operation window on a device as an example according to the present embodiment.
Figure 8B:
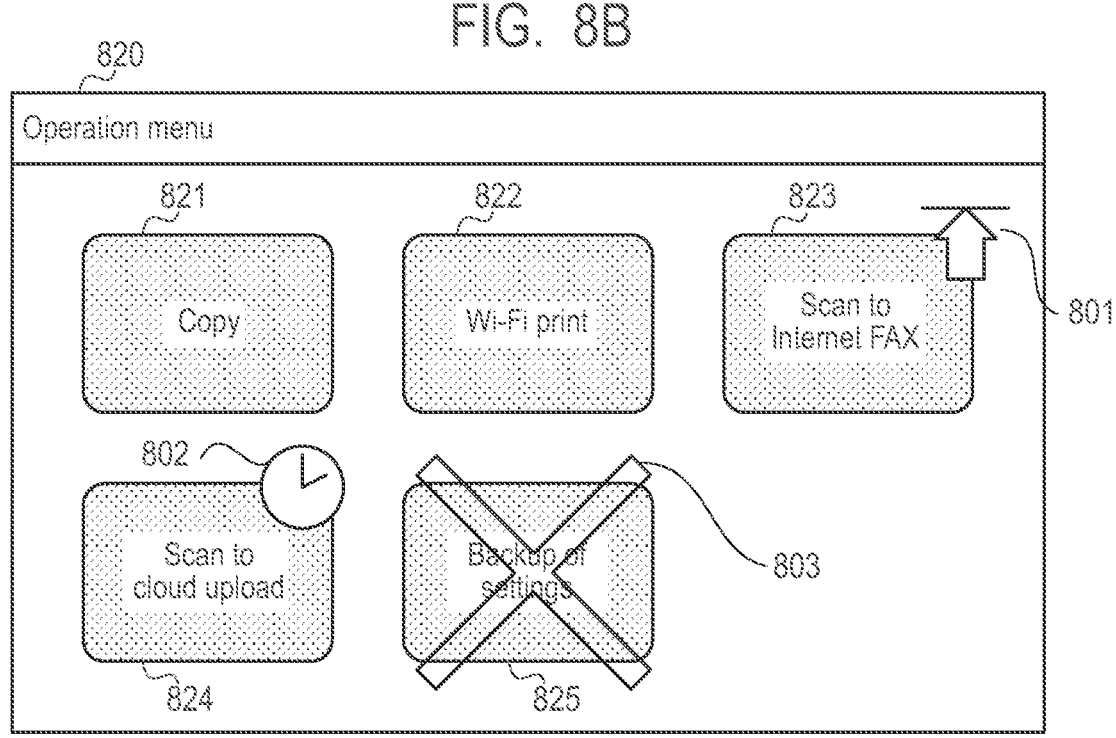
FIG. 8B is a diagram illustrating an operation window on the device as an example according to the present embodiment.

FIG. 8A and FIG. 8B are diagrams illustrating an example of the operation window displayed on the input I/F unit 202 of the device 110.

FIG. 8A is an example of the operation window in a contract where all the functions are available. FIG. 8A corresponds to a case where all the operation buttons are operable.

FIG. 8B is an example of the operation window in a contract where use of some functions is limited. Specifically, this corresponds to an operation window in a state where the job management unit 302 of the device 110 has controlled enablement or disablement of execution of respective functions based on the service setting as illustrated in FIG. 5. FIG. 8B differs from FIG. 8A in display of some operation buttons.

For the "Scan to Internet FAX" button, since the upper limit of the data capacity up to which communication is enabled is set in the example of FIG. 5, an icon 801 indicating a communication limit is displayed beside the operation button in FIG. 8B.

For the "Scan to cloud upload" button, since a time of day when the execution is enabled is set in the example of FIG. 5, a clock-like icon 802 is displayed beside the operation button in FIG. 8B.

For the "Backup of settings" button, since being unavailable is set in the example of FIG. 5, an icon 803 indicating of disablement of pressing is displayed beside the operation button in FIG. 8B.

Figure 9A:
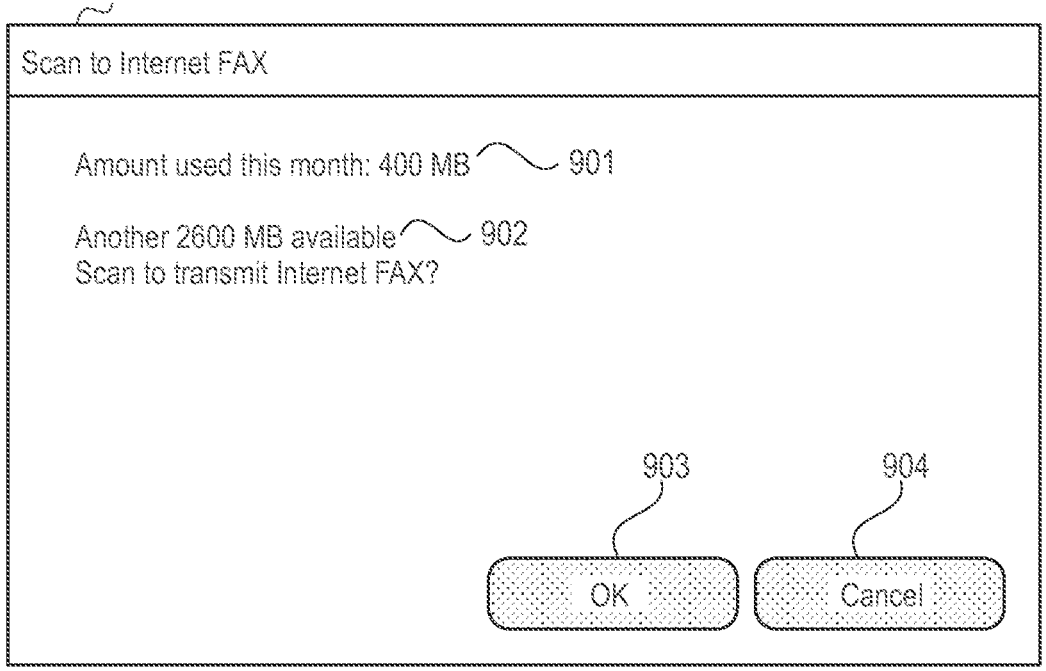
FIG. 9A is a diagram illustrating a window on the device when a communication volume upper limit is set as an example.
Figure 9B:
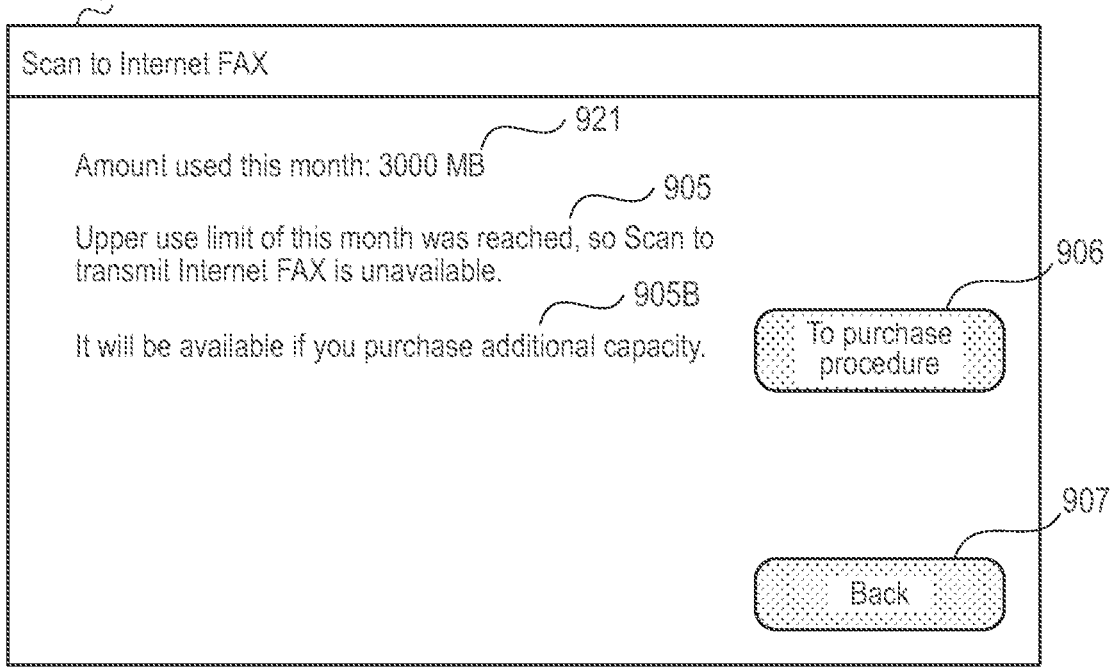
FIG. 9B is a diagram illustrating a window on the device when a communication volume upper limit set as an example.

FIG. 9A and FIG. 9B are diagrams illustrating an example of the operation window of the device 110 when a function for which the communication volume upper limit is set has been executed. Specifically, this corresponds to a window example when the "Scan to Internet FAX" button is pressed in FIG. 8B.

FIG. 9A is a window in a state where the communication volume upper limit is not exceeded. The current communication volume (901) and the communication volume available up to the upper limit (902) are displayed, and execution of the function is enabled. In response to an OK button 903 being pressed, the function of "Scan to Internet FAX" is executed. Further, in response to a cancel button 904 being pressed, the window returns to the window of FIG. 8B, for example.

FIG. 9B is a window in a state where the communication volume upper limit is exceeded. A message (905) to the effect that execution of the selected function is disabled unless an additional use contract is made is displayed. In this state, once the user presses a "To purchase procedure" button 906 to make an additional use contract, the contract information managed by the contract management unit 311 of the device management server 120 is added or updated, and enablement or disablement of execution of each function of the device is controlled based on the content of the new service setting.

In response to a back button 907 being pressed, the window returns to the window of FIG. 8B.

Note that, in FIG. 9A, a change of the content of job settings may be suggested to the user in accordance with the usage status of the communication volume (for example, when the current communication volume has reached a level close to the communication volume upper limit specified by the service setting (or when the upper limit is about to be exceeded)). For example, to reduce the communication volume, displaying a button used for executing a job having a setting to reduce resolution of a scan image or reduce the number of colors may be considered.

Figure 10A:
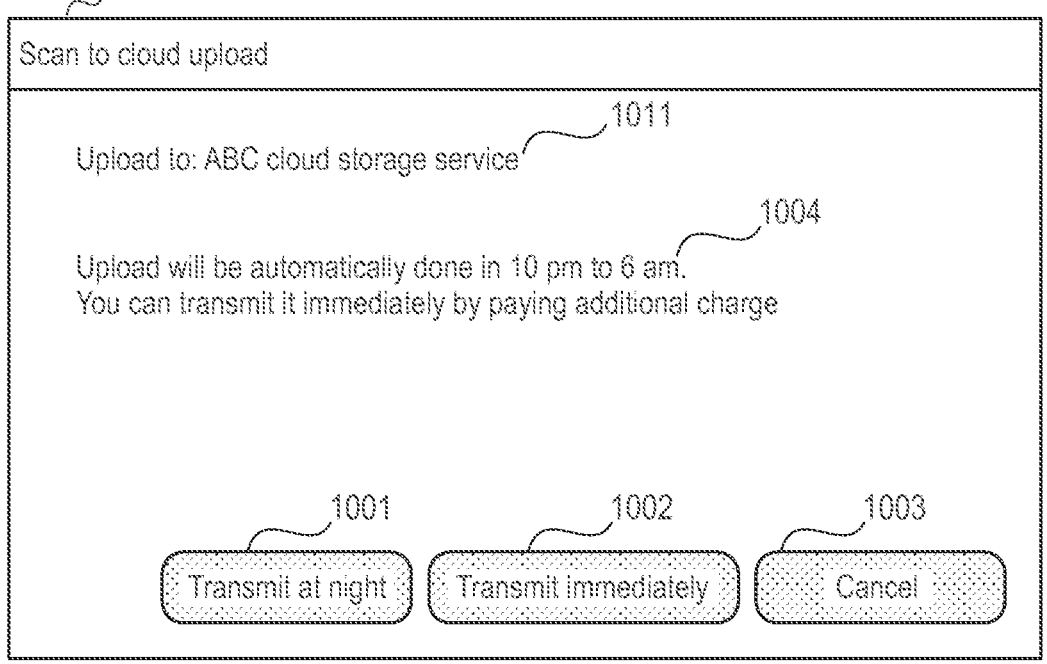
FIG. 10A is a diagram illustrating a window on the device when a function execution enabled time is set as an example.
Figure 10B:
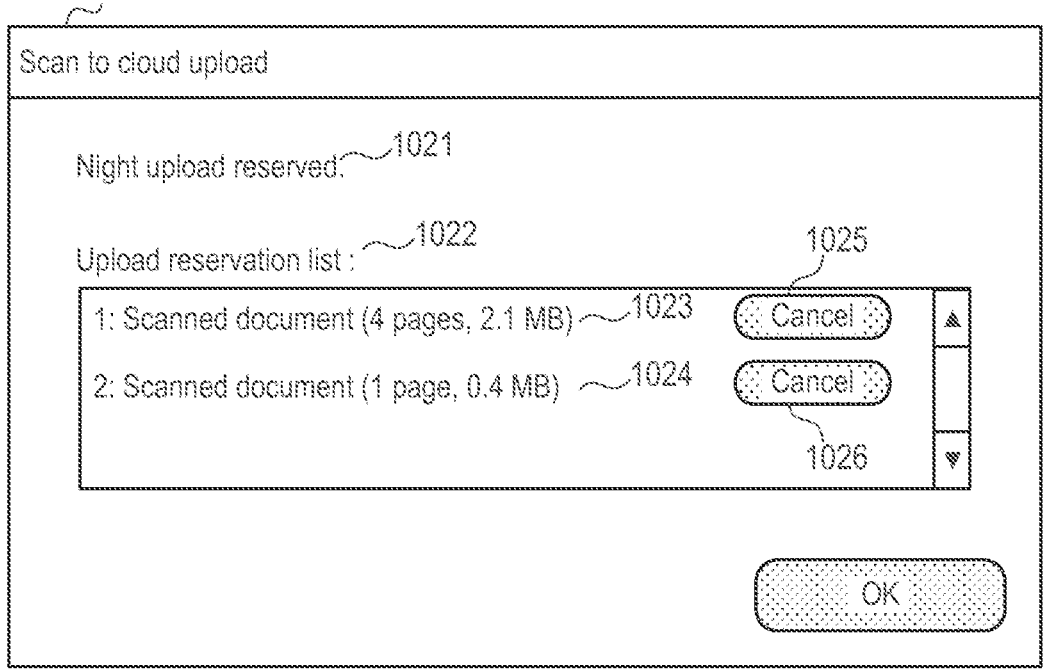
FIG. 10B is a diagram illustrating a window on the device when a function execution enabled time is set as an example.

FIG. 10A and FIG. 10B are diagrams illustrating an example of the operation window of the device 110 when a function for which an execution enabled time is set has been executed. Specifically, this is a window example when the "Scan to cloud upload" button is pressed in FIG. 8B.

FIG. 10A is a window in a state where a function is executed outside the execution enabled time. An indication of the execution enabled time (1004) and a button used for making a reservation so that a function is automatically executed when the execution enabled time comes ("Transmit at night" button 1001) are displayed. Furthermore, with an additional use contract being made, a button used for executing a function immediately regardless of the execution enabled time ("Transmit immediately" button 1002) is also displayed. Herein, once an additional use contract is made via the "Transmit at night" button 1001, the contract information managed by the contract management unit of the device management server 120 as described above is added or updated, and enablement or disablement of execution of each function of the device is controlled based on the content of the new service setting.

In response to a cancel button 1003 being pressed, the window returns to the window of FIG. 8B, for example.

FIG. 10B is an operation window of the device 110 when the "Transmit at night" button 1001 has been pressed in FIG. 10A. In response to the "Transmit at night" button 1001 being pressed in FIG. 10A, the instruction thereof is input from the input I/F unit 202 of the device 110. In response to this instruction, a scan is executed by the job management unit 302, and a scanned document is stored in the storage device 203. Further, transmission reservation information on the scanned document is stored in the storage device 203 by the job management unit 302, and a list of transmission reservation information as illustrated in FIG. 10B is displayed on the operation window of the device 110. When the set time (10 pm in the example of FIG. 10A and FIG. 10B) comes, the reserved transmission process is automatically, sequentially executed by the job management unit 302. Note that, if it is before the execution, the reservation can be cancelled by using the "Cancel" button.

Note that, as described above, buttons used for selecting a job execution time (1001, 1002) are displayed in FIG. 10A with respect to a function for which an execution enabled time is set. In FIG. 8B, however, an operation menu such as "Upload together" that differs from the normal state may be displayed. In response to this "Upload together" button being pressed, the job management unit 302 makes a reservation so that a function is automatically executed when the execution enabled time comes in a similar manner to the case where the "Transmit at night" button 1001 is pressed.

Figure 11:
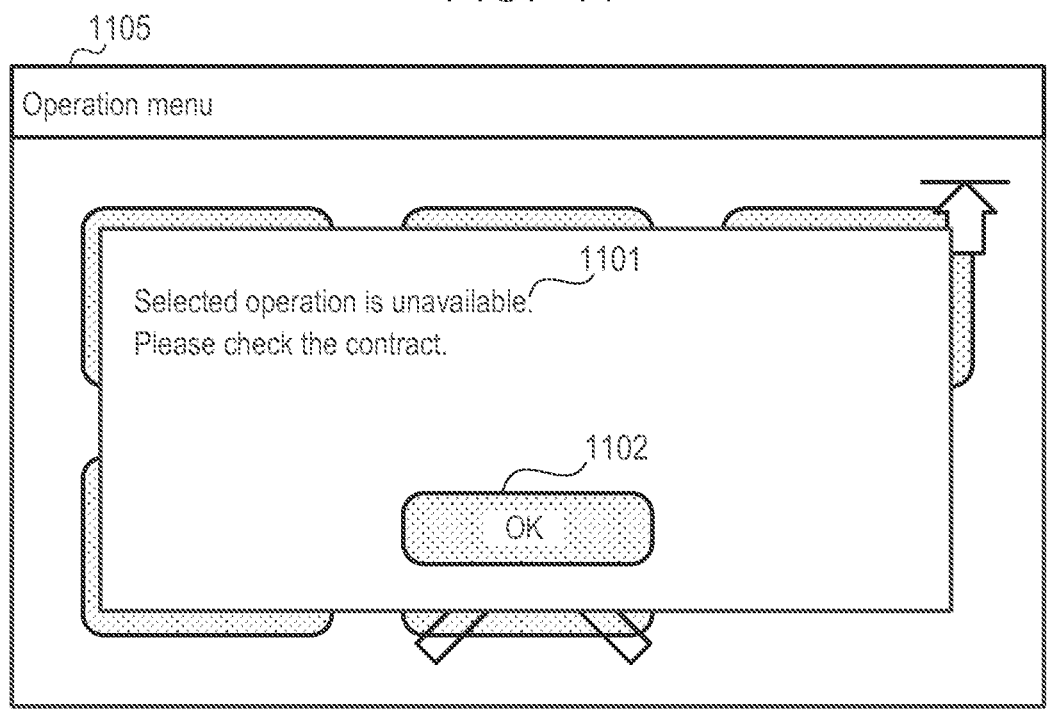
FIG. 11 is a diagram illustrating a window on the device when function execution disablement is set as an example.

FIG. 11 is a diagram illustrating an example of the operation window of the device 110 when the user tries to execute a function for which execution disablement is set. Specifically, this is a window example when the "Backup of settings" button is pressed in FIG. 8B. Since the contract does not permit execution of the selected function, a message to that effect (1101) is displayed, and execution of the function is disabled. In response to the OK button 1102 being pressed, the window returns to the window of FIG. 8B, for example.

Figure 12:
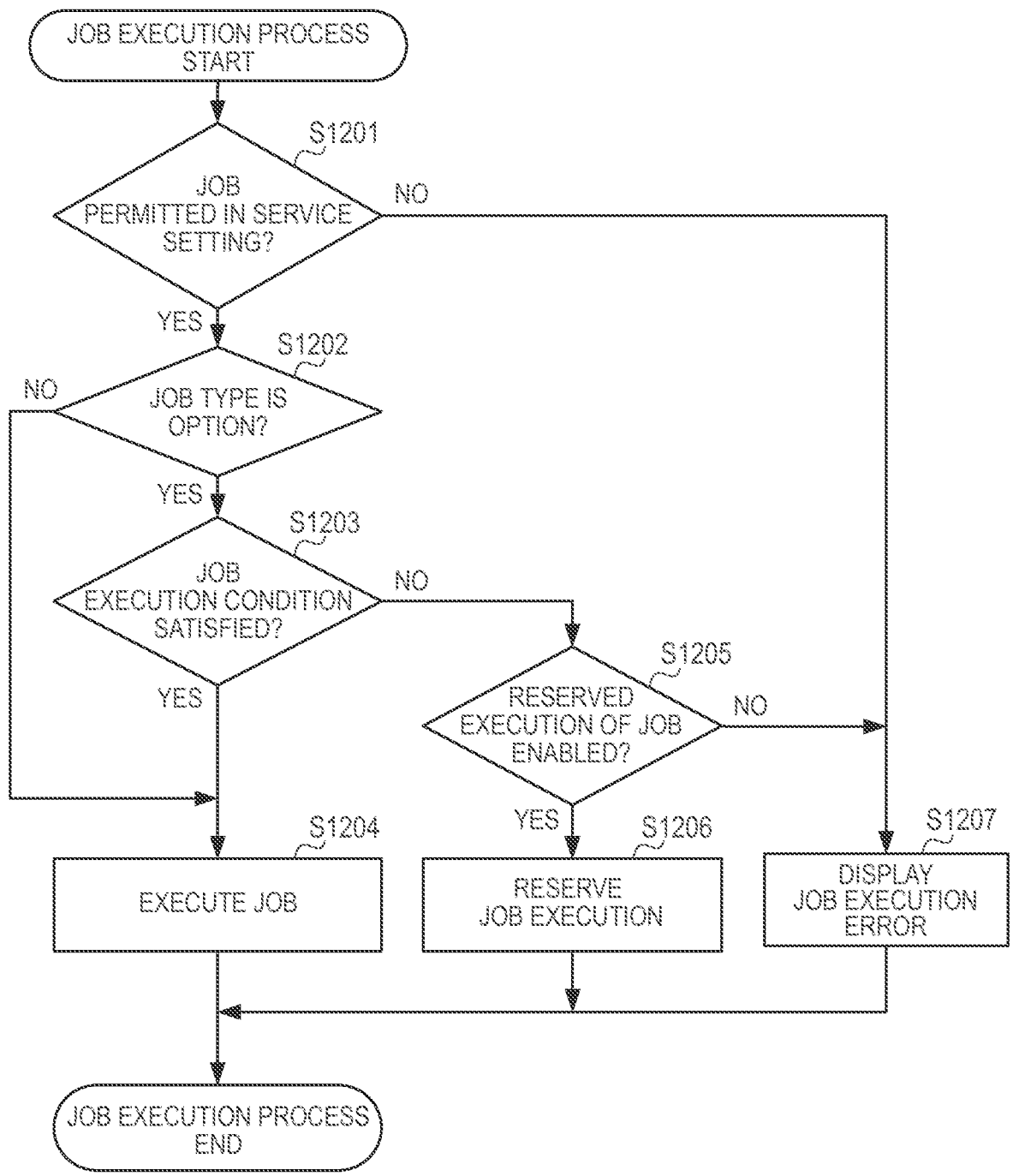
FIG. 12 is a flowchart illustrating a process when a job management unit executes a job as an example.

FIG. 12 is a flowchart illustrating an example of a process when the job management unit 302 executes a job. The process of this flowchart is implemented when the CPU 205 performs the process based on a program stored in the storage device 203 or the memory 204.

In S1201, the job management unit 302 determines whether or not a job to be executed is permitted in the service setting acquired in S701 of FIG. 7. Specifically, in the example of FIG. 5, the jobs whose value of "enabled" is "true" are permitted jobs. If the job to be executed is permitted in the service setting (S1201, Yes), the job management unit 302 proceeds with the process to S1202. In contrast, if the job to be executed is not permitted in the service setting (S1201, No), the job management unit 302 proceeds with the process to S1207.

In S1202, the job management unit 302 determines whether or not the job type to be executed is option. Specifically, in the example of FIG. 5, the jobs whose value of "type" is "option" are option jobs. If the job type is option (S1202, Yes), the job management unit 302 proceeds with the process to S1203. In contrast, if the job type is not option (S1202, No), the job management unit 302 proceeds with the process to S1204. In this step, by distinguishing whether the job to be executed is a job corresponding to the basic communication (the value of "type" is "basic") or a job corresponding to the option communication (the value of "type" is "option"), it is possible to suitably control a function (communication for each function) in accordance with the contract form or the like in the subsequent steps.

In S1203, the job management unit 302 determines whether or not the job to be executed satisfies the execution condition. The execution condition represents a communication volume or an execution time of day, for example. If the job to be executed satisfies the execution condition (S1203, Yes), the job management unit 302 proceeds with the process to S1204. In contrast, if the job to be executed does not satisfy the execution condition (S1203, No), the job management unit 302 proceeds with the process to S1205.

In S1204, the job management unit 302 executes the job to be executed.

In S1205, the job management unit 302 determines whether or not reserved execution of the job to be executed is enabled. For example, if a time of day when the execution of the job is enabled is set, it is possible to make a reservation so that the job is executed in that time of day.

Further, in a case of a function for which the communication volume is limited on a monthly basis, it is possible to make a reservation so that the job is executed in the following month.

If the reserved execution of the job is enabled, and making a reservation is instructed by the user (S1205, Yes), the job management unit 302 proceeds with the process to S1206.

In contrast, if the reserved execution of the job is disabled or no reservation is instructed by the user even if the reserved execution of the job is enabled (S1205, No), the job management unit 302 proceeds with the process to S1207.

Herein, the instruction of reserved execution provided by the user may be accepted via the input I/F unit 202 as illustrated in FIG. 10A or may be described as the service setting illustrated in FIG. 5.

In S1206, the job management unit 302 reserves the execution of the job to be executed described above in a time of day set in the service setting. The reserved job is automatically executed by the job management unit 302 at a predetermined timing based on the device time information. That is, the job management unit 302 controls the execution of the function to be delayed to a predetermined time of day based on the service setting.

In S1207, the job management unit 302 displays, on the output I/F unit 201, a message to the effect that execution of the job to be executed is disabled. That is, the job management unit 302 disables execution of the function based on the communication volume.

After the process of S1204, S1206, or S1207 described above, the job management unit 302 ends the process of this flowchart.

Figure 13:
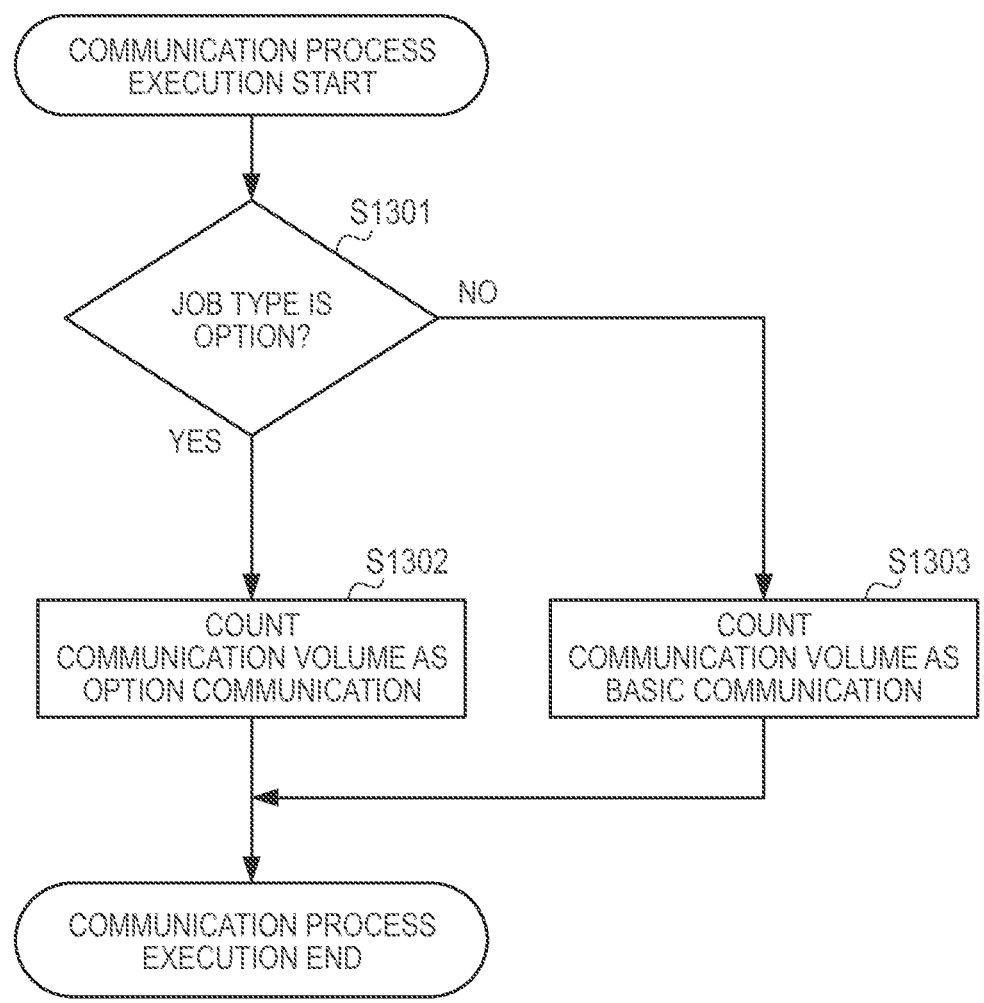
FIG. 13 is a flowchart illustrating a communication volume count process involved in job execution as an example.

FIG. 13 is a flowchart illustrating an example of the process (communication volume count process) performed by the communication volume management unit 303 when performing communication due to job execution of the device 110. The process of this flowchart is implemented when the CPU 205 performs the process based on a program stored in the storage device 203 or the memory 204.

In S1301, the communication volume management unit 303 determines whether or not the job type to be executed is option. Specifically, in the example of FIG. 5, the jobs whose value of "type" is "option" are option jobs. If the job type is option (S1301, Yes), the communication volume management unit 303 proceeds with the process to S1302. In contrast, if the job type is not option (S1301, No), the communication volume management unit 303 proceeds with the process to S1303.

In S1302, the communication volume management unit 303 counts, as an option communication volume, the communication volume generated due to execution of the job.

In S1303, the communication volume management unit 303 counts, as a basic communication volume, the communication volume generated due to execution of the job.

After the process of S1302 or S1303, the communication volume management unit 303 ends the process of this flowchart.

As described above, by distinguishing in S1301 whether the job to be executed is a job corresponding to the basic communication (the value of "type" is "basic") or a job corresponding to the option communication (the value of "type" is "option"), it is possible to count the communication volumes of the basic communication and the option communication, respectively.

FIG. 14 is a diagram illustrating an example of the communication volume information managed by the communication volume management unit 303.

The communication ID is an identifier for uniquely identifying communication.

The communication target represents information on the target with which the device 110 has communicated, which is a Fully Qualified Domain Name (FQDN) in the example of FIG. 14.

The job type is a type of a job that has triggered the communication.

The communication type is defined on a job type basis in a service setting and is information indicating whether or not communication of interest is the option communication.

The communication start time and the communication end time are information on a time when the communication of interest started and a time when the communication of interest ended, respectively.

The communication volume corresponds to a data size handled in the communication of interest.

The communication volume information illustrated in FIG. 14 is stored in the storage device 203 of the device 110 by the communication volume management unit 303 in S1302 or S1303 of FIG. 13.

Note that, when the communication control as with FIG. 9A, FIG. 9B, FIG. 10A, and FIG. 10B of the present embodiment is performed, the current time may be within an unavailable time of day, or the communication may be unavailable unless an additional capacity is purchased. In such a case, if there is an available device of other devices 110 managed by the same contract or associated with the same customer, use of the available device may be suggested to the user.

For example, in the example of FIG. 6, the contract ID of a device having a serial number "AAA00001" is "00001", and the contract ID of a device having a serial number "BBB00001" is "00002". Therefore, in the example of FIG. 4, it can be seen that these two devices are used by a customer of the same customer ID "C00001". At this time, while the communication volume has already exceeded the upper limit in the device having the serial number "AAA00001", the communication volume has not yet reached the upper limit in the device having the serial number "BBB00001". In such a case, in FIG. 9B, a message to the effect that the device having the serial number "BBB00001" is available may be displayed to suggest use of that device.

As described above, in the first embodiment, the communication volume of a device is managed based on a service setting corresponding to a user contract form, and execution of a job involving communication is controlled. Thus, communication for each function of a device can be flexibly controlled in accordance with the content, the time of day, or the like of communication in accordance with the user contract form. As a result, a flexible service (for example, a cloud service) in accordance with the user contract form can be provided without a burden on the user.

Second Embodiment

Although the configuration in which a communication volume is managed on the device side has been described in the above first embodiment, a configuration in which a communication volume associated with a device is managed on the device management server side may be employed. Such a configuration will be described below in the second embodiment.

In the second embodiment, the configurations illustrated in FIG. 1 to FIG. 2, FIG. 4, FIG. 6 to FIG. 12, and FIG. 14 are the same as those in the first embodiment, and the same features as those in the first embodiment are labeled with the same references to omit the description thereof. The features different from those in the first embodiment will be mainly described below.

Figure 15:
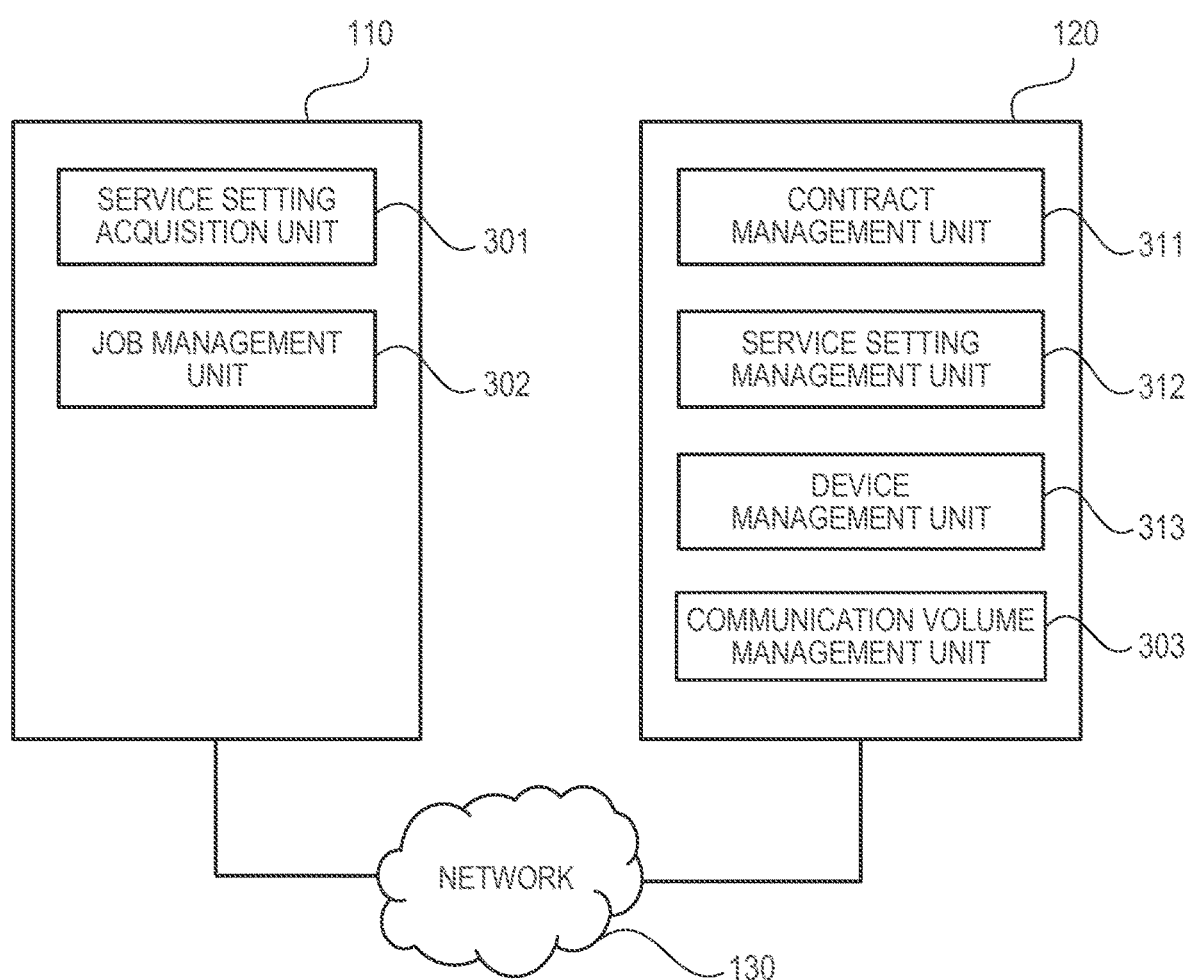
FIG. 15 is a software configuration diagram according to a second embodiment.

FIG. 15 is a block diagram illustrating a main configuration part (configuration portion related to the present embodiment) of the device 110 and the device management server 120. A difference from FIG. 3 is in that the communication volume management unit 303 is present in the device management server 120 instead of in the device 110.

The communication volume management unit 303 of the device management server 120 counts the communication volumes of the option communication and the basic communication, respectively, in the same manner as in the process illustrated in FIG. 13 in accordance with job longs or the like notified from the device 110, for example. Further, based on the result of the count, the communication volume management unit 303 stores the communication volume information in the storage device 203 of the device management server 120 on a device basis, for example, as with FIG. 14.

Figure 16B:
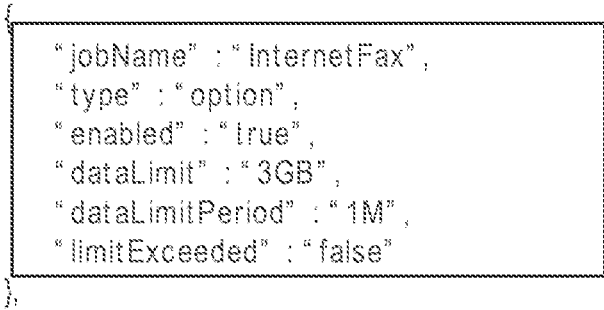
FIG. 16B is a diagram illustrating a service setting as an example according to the second embodiment.

FIG. 16A and FIG. 16B are diagrams illustrating an example of the service setting managed in the service setting management unit 312. A difference from FIG. 5 is in that, with respect to a job for which a limit of the communication volume is set, information indicating excess of a limit and information indicating a condition to reset the excess of the limit are added.

Specifically, in a block 1601 of FIG. 16A, the value of "limitExceeded" is "true", and the value of "limitResetAt" is "2020/06/01". That is, these values indicate that the currently available communication volume is exceeded and the exceeded state will be reset on Jun. 1, 2020. In a state where the available communication volume is exceeded, execution of a job is limited as with FIG. 9B.

FIG. 16B is an example of a service setting when the exceeded state has been reset after Jun. 1, 2020. Compared to FIG. 16A, the value of "limitExceeded" has changed to "false", and the value of "limitResetAt" is not set.

The process to reset an exceeded state and update the service setting from FIG. 16A to FIG. 16B is performed by the service setting management unit 312 of the device management server 120 at a predetermined timing (for example, once a day).

According to the second embodiment described above, it is possible to reduce the load on the device 110 by performing management of the communication volume in the device management server 120. As a result, even with an inexpensive device having a relatively lower processing capacity, communication for each device function can be flexibly controlled in accordance with the content, the time of day, or the like of communication in accordance with a user contract form. As a result, a flexible service (for example, a cloud service) in accordance with the user contract form can be provided without a burden on the user.

Note that, although a service setting is held in association with a contract in the first and second embodiments, the service setting may be held in association with each SIM. In such a case, a SIM ID is held in the contract information of FIG. 4, and a service ID is associated with each SIM ID. Further, the device 110 acquires a service setting associated with the mounted SIM ID and, based on the service setting, performs control of job execution.

As described above, according to each of the embodiments, it is possible to flexibly control management of user communication (option communication) or provision of a service while providing a basic service of an IoT device.

The configurations and contents of the data described above do not limit the present disclosure. Various configurations and contents of data may be used for embodiments of the present disclosure depending on the use and purpose.

Although embodiments have been described above, embodiments of the present disclosure may be implemented as, for example, a system, apparatus, method, program, storage medium, or the like. Specifically, embodiments of the present disclosure may be applied to a system comprising multiple apparatuses, or may be applied to an apparatus comprising a single apparatus.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-003813, filed on Jan. 13, 2022, which is hereby incorporated by reference herein in its entirety.

What is claimed is:

1. A network device comprising:
a Subscriber Identity Module (SIM);
one or more memories storing instructions, and
one or more processors capable of executing the instructions causing the network device to:
acquire a service setting based on a service contract from a management server that manages the service setting in association with the service contract;
execute, based on the service setting, a basic function for transmitting via a first communication using the SIM at least one of counter information of the network device, operation information of the network device and consumable information of the network device, wherein the basic function is regularly executed based on the service setting;
execute, based on the service setting, a display control for an optional function that requires a second communication using the SIM; and
execute the optional function including a data transmission via the second communication, wherein a communication volume of the second communication that had been used for the optional function is counted and managed,
wherein the display control is executed for providing a confirmation of a limitation related to the optional function and receiving a user intention of an execution of the optional function, and wherein the optional function is executed after the display control.

2. The network device according to claim 1, wherein the instructions further cause the network device to delay, based on the service setting, the second communication to a time of day specified by the service setting.

3. The network device according to claim 1, wherein the instructions further cause the network device to disable execution of the optional function using the second communication based on the service setting and the communication volume.

4. The network device according to claim 3, wherein the instructions further cause the network device to provide, when the managed communication volume has reached a communication volume upper limit specified by the service setting or when the current time is within an unavailable time of day, a notification that suggests use of another network device managed under the same service contract or managed in association with the same customer.

5. The network device according to claim 2, wherein, when the managed communication volume has reached a level close to a communication volume upper limit specified by the service setting, a notification that suggests a change of a setting of the optional function to be executed is further provided as the display control.

6. The network device according to claim 1, wherein the network device is an image processing device.

7. The network device according to claim 1, wherein in a case where the service contract has been updated, control the optional function for the network device based on a new service setting in association with the updated service contract, not the previous contract.

8. A control method for a network device comprising a Subscriber Identity Module (SIM), the control method comprising:
acquiring a service setting based on a service contract from a management server that manages the service setting in association with the service contract;
executing, based on the service setting, a basic function for transmitting via a first communication using the SIM at least one of counter information of the network device, operation information of the network device and consumable information of the network device, wherein the basic function is regularly executed based on the service setting;
executing, based on the service setting, a display control for an optional function that requires a second communication using the SIM; and
executing the optional function including a data transmission via the second communication, wherein a communication volume of the second communication that had been used for the optional function is counted and managed, wherein the display control is executed for providing a confirmation of a limitation related to the optional function and receiving a user intention of an execution of the optional function, and wherein the optional function is executed after the display control.

9. A non-transitory computer-readable storage medium storing one or more programs including instructions, which when executed by one or more processors of the network device, cause the network device to perform the control method according to claim 8.

* * * * *